United States Patent [19]

Bergmann

[11] Patent Number: 4,796,666

[45] Date of Patent: Jan. 10, 1989

[54] SANITARY SINGLE-HANDLE MIXING VALVE

[75] Inventor: Konrad Bergmann, Wittlich, Fed. Rep. of Germany

[73] Assignee: American Standard Inc., New York, N.Y.

[21] Appl. No.: 104,629

[22] Filed: Oct. 5, 1987

[30] Foreign Application Priority Data

Oct. 6, 1986 [DE] Fed. Rep. of Germany ....... 3633995
Oct. 6, 1986 [DE] Fed. Rep. of Germany ....... 8627223

[51] Int. Cl.$^4$ ............................................. F16K 11/06
[52] U.S. Cl. ............................ 137/625.17; 137/625.41
[58] Field of Search ............ 137/625.17, 625.4, 625.41

[56] References Cited

U.S. PATENT DOCUMENTS

| | | | |
|---|---|---|---|
| 4,325,403 | 4/1982 | Uhlmann | 137/625.17 X |
| 4,513,781 | 4/1985 | Nikolayczik | 137/625.17 X |
| 4,540,023 | 9/1985 | Pawelzik | 137/625.17 |
| 4,576,202 | 3/1986 | Knapp | 137/625.17 |
| 4,621,659 | 11/1986 | Pawelzik | 137/625.17 |

*Primary Examiner*—John Rivell
*Attorney, Agent, or Firm*—James J. Salerno, Jr.; Robert G. Crooks; John P. Sinnott

[57] ABSTRACT

The invention relates to a sanitary single-handle mixing valve having control elements composed of at least two discs, one of which serves as a fixed valve seat disc with two inlet openings for cold and hot water. For purposes of operating the mixing valve in combination with thermally or hydraulically controlled flow heaters, the centroids of the port areas of the inlet openings, or at least the centroid of the port area of the cold water inlet opening, is shifted a few degrees of angle towards the cold water setting in order to achieve hydraulic asymmetry when the operating handle is in its central position.

4 Claims, 11 Drawing Sheets

SANITARY SINGLE-HANDLE MIXING VALVE

BACKGROUND OF THE INVENTION

1. Field of the Invention

The invention relates to a single-handle, sanitary mixing valve having control elements composed of at least two discs, one of which serves as a fixed valve seat disc with two inlet openings for cold and hot water, while the second disc, movably disposed on the valve seat disc, has a control edge that at least partially reduces the free flow area for cold water at the inlet opening when the movable disc is shifted to its central position by the operating handle, as compared to the corresponding free flow area of the hot water inlet opening of the fixed valve seat, in the mixed water temperature ranges conventionally bounding a so-called comfort zone.

2. Description of the Prior Art

When mixing fittings are operated in combination with thermally or hydraulically controlled flow heaters, malfunctions will often occur in the ordinary mixed water temperatures because the heaters require certain minimum flow rates. If these minimum flow rates are not maintained, the heaters will switch off in whole or in part.

To avoid such malfunctions, there are known single-handle mixing valves of the type described in which the mixing chamber opening in the movable disc is asymmetrically shaped relative to a symmetrical port configuration in the fixed valve seat disc, to ensure that the free flow area at the inlet opening for cold water will be smaller than on the corresponding hot water side in the mixed water temperature ranges. Such a mixing valve, from which the present invention departs, is disclosed in German Letter of Disclosure No. 3,310,080. It has proved successful in practice. A disadvantage of the known devices is that the movable disc, owing to the special configuration of the mixing chamber opening, must be a special part, that is, differing from the corresponding discs of conventional single-handle mixing valves.

SUMMARY OF THE INVENTION

With the foregoing in mind, an object of the invention is to provide a sanitary mixing valve wherein the movable disc may be of conventional configuration or the fixed valve seat disc may be of conventional configuration. Another object of the invention is to provide a mixing valve, in combination with thermally or hydraulically controlled flow heaters, which is simple to construct and easy to manufacture, and affords reliable operation.

The sanitary mixing valve of the present invention provides that the centroids of the port areas of the inlet openings in the fixed valve seat disc, or at least the centroid of the port area of the inlet opening for cold water, are shifted a few degrees of angle toward the cold water setting in order to achieve hydraulic asymmetry in the central positions of the operating handle.

According to one form of the invention, the conventional configuration of the movable disc is unmodified while the inlet opening for hot water is made larger than the inlet opening for cold water so that hydraulic symmetry is achieved when the handle is in its central position.

According to another form of the invention, the inlet opening for cold water is made kidney-shaped; the interior edge of the opening is drawn inwardly.

According to still another form, of the invention, the lengthwise axis of the inlet opening for hot water is greater than the axis of the inlet opening for cold water.

A further form of the invention provides that the control edge of the movable disc reduces the free flow area at the inlet opening of cold water, when compared to the corresponding area of the hot water opening, so that the centroid of the port area of the inlet opening for cold water is shifted radially in the direction of opening of the control edge of the movable disc relative to the inlet opening for hot water.

BRIEF DESCRIPTION OF THE DRAWINGS

In the drawings, the subject matter of the invention is represented in three embodiments by way of example where:

FIGS. 3A to 13A are bottom plan views of the fixed valve seat disc and movable disc of FIGS. 2A and 2B in full assembly, with the movable disc of FIG. 2B shown in various functional positions of the valve assembly, namely, FIG. 3, its closed position, FIGS. 4A-4B through 7A-7B, hot water positions, FIGS. 8A-8B to 13A-13B, its cold water positions;

FIGS. 3B-13B are sectional views, in elevation, of the respective views of FIGS. 3A-13A, which illustrate water flow through the valving assembly, as seen by following the direction of the arrows;

DETAILED DESCRIPTION OF THE PREFERRED EMBODIMENTS

Figure 1:
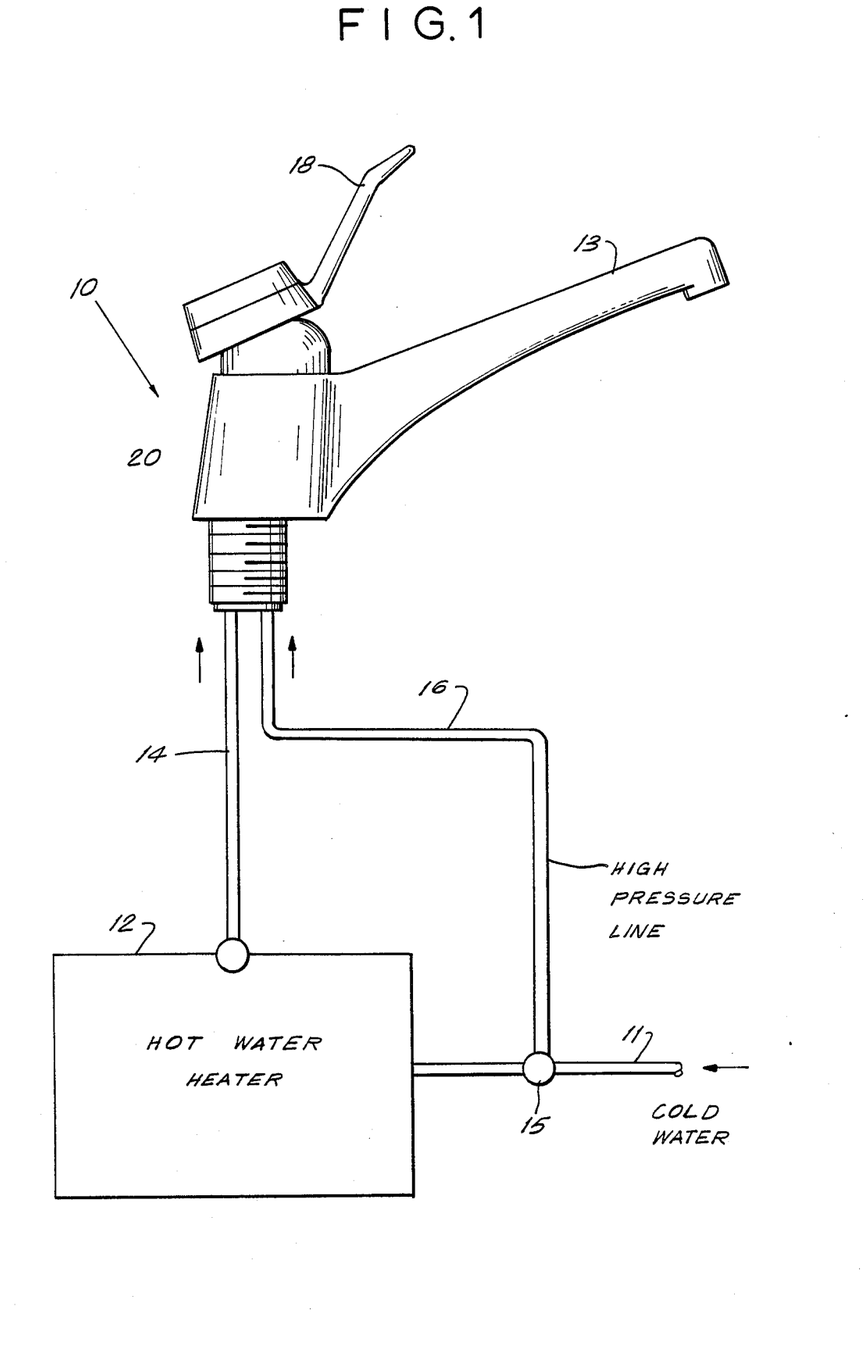
FIG. 1 is a schematic representation of the single-handle mixing valve of the present invention, operably coupled to a flow heater.

FIG. 1 illustrates, schematically, a single-handle mixing valve assembly 10, operably coupled to a flow heater 12 by hot water conduit 14 and cold water conduit 16. Main water supply conduit 11 is coupled to flow hot water heater 12 and cold water conduit 16 through "T" coupling 15.

Mixing valve 10 includes a valve housing 20 in which valve cartridge 22 is arranged with control elements having two valve discs 24 and 26. Disc 24 is fixed in cartridge 22 and serves as a valve seat. Fixed disc 24 is formed with an inlet opening 21 for hot water and an inlet opening 23 for cold water, as well as an outlet opening 25 for mixed water leading to spout 13 of mixing valve assembly 10.

FIGS. 2A, 2B through 13A, 13B illustrate in bottom plan views and sectional view in elevation, respectively, fixed disc 24 and movable disc 26 in their various respective operative positions from fully closed to fully opened, shown by the direction of the arrows in sectional views, in elevation, of FIGS. 4B through 13B. Movable disc. 26 is shown in dotted line. Also, the position of handle 18 is shown by the arrow above each view of the valve discs in plan.

Figure 2A:
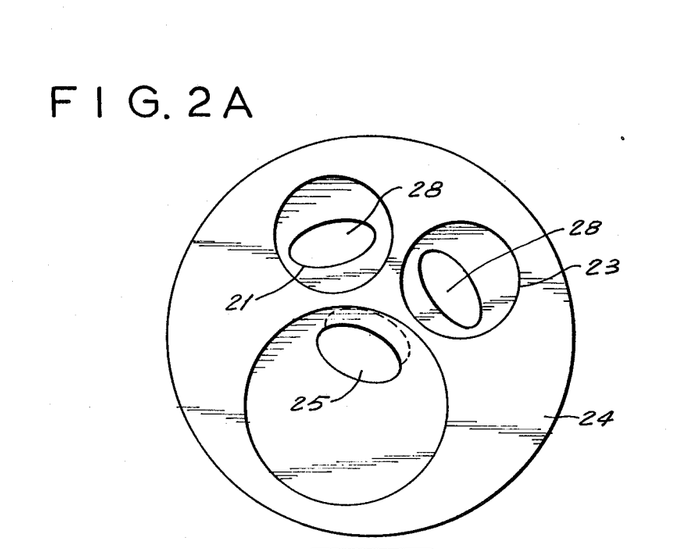
FIGS. 2A and 2B are bottom plan views of the fixed valve seat disc and movable disc, according to an embodiment of the invention.
Figure 2B:
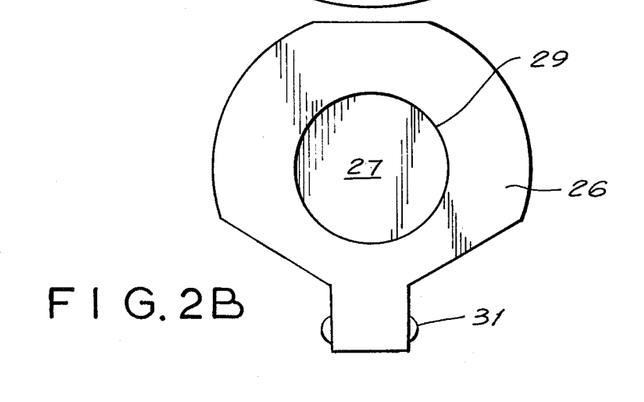
Figure 3A:
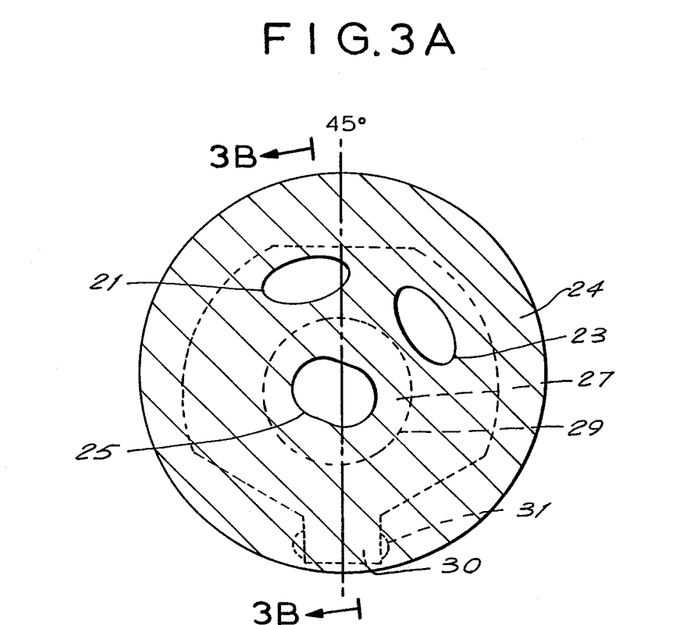
Figure 3B:
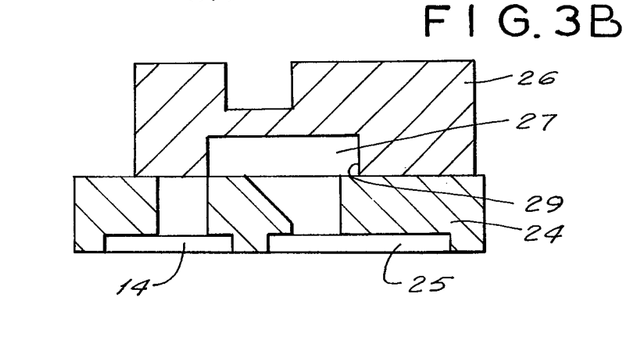
Figure 4A:
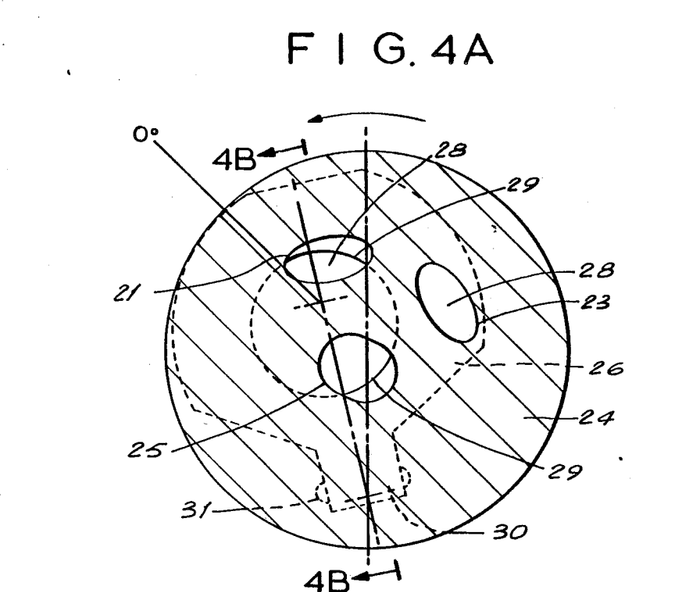
Figure 4B:
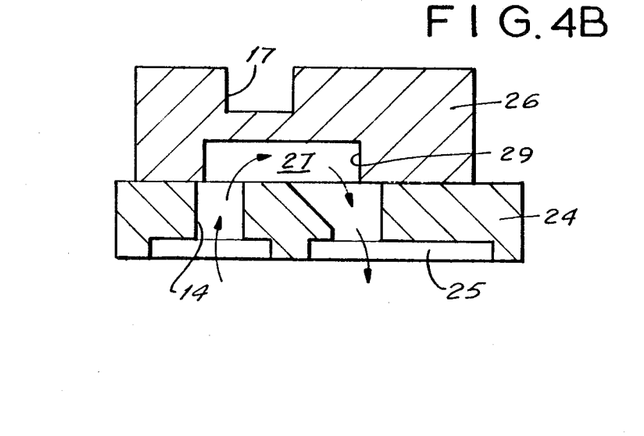
Figure 5A:
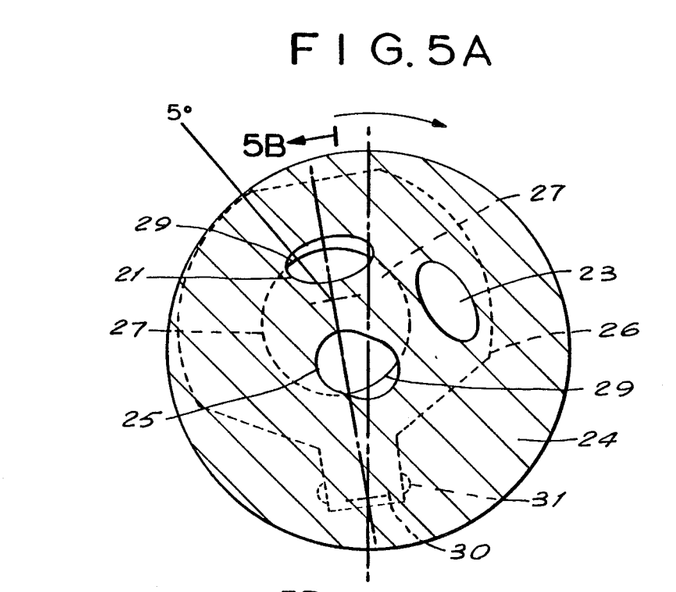
Figure 5B:
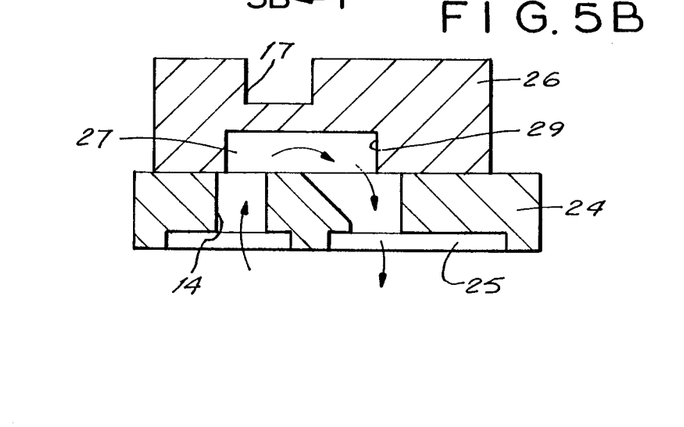
Figure 6A:
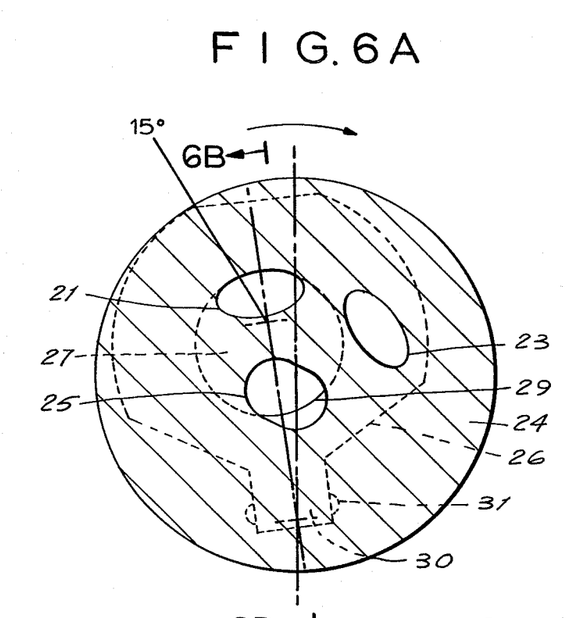
Figure 6B:
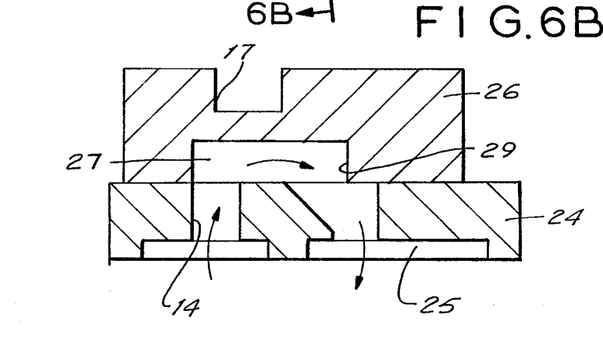
Figure 7A:
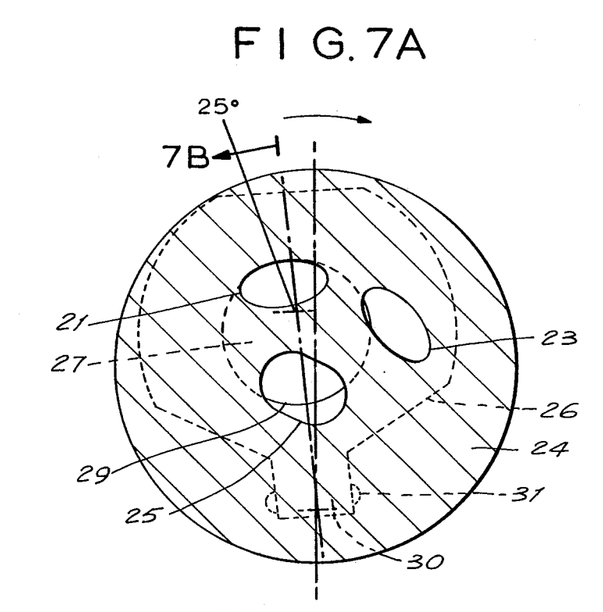
Figure 7B:
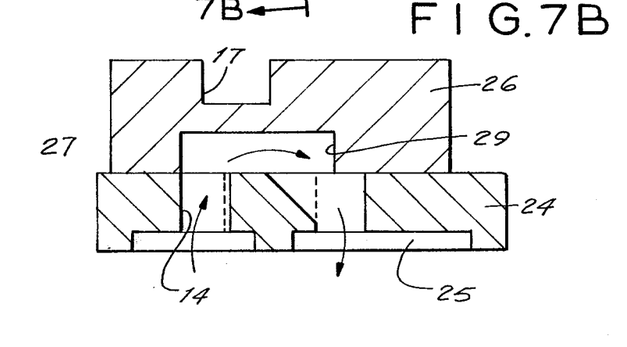
Figure 8A:
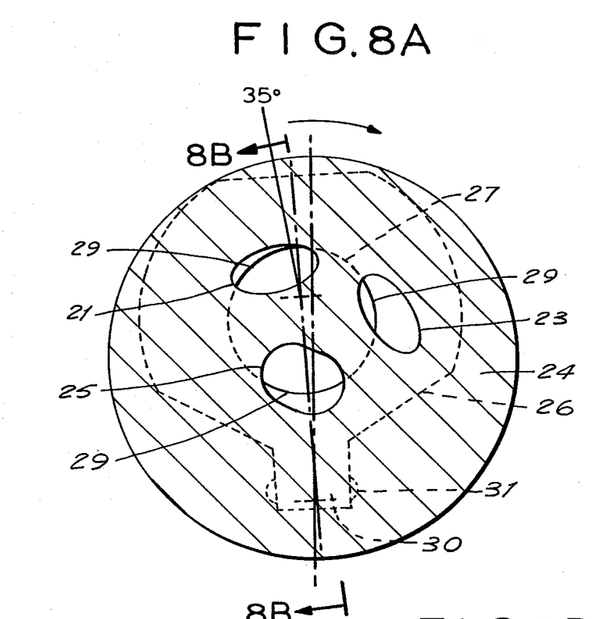
Figure 8B:
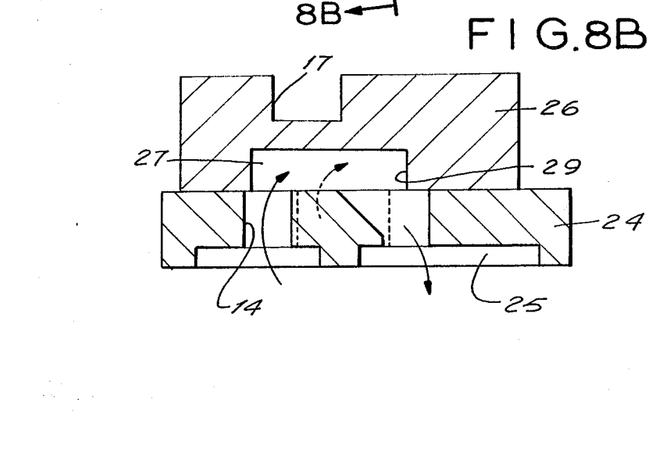

FIG. 2A shows valve discs 24,26 in their closed position, with no water flow through the valve disc, FIG. 2B.

Figure 1A:
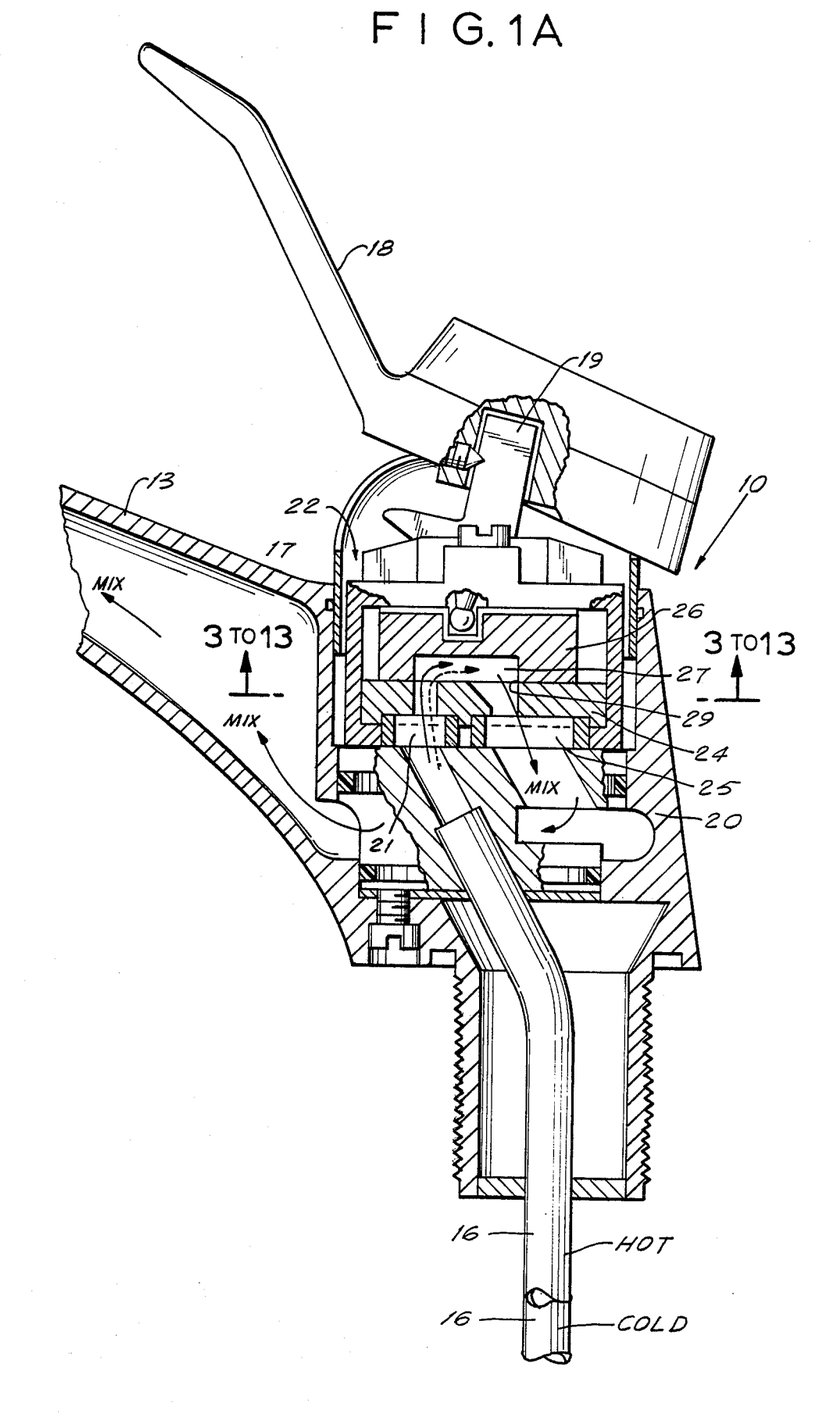
FIG. 1A is an elevational view, in section, of a single-handle mixing valve in its opened position, shown in FIG. 1.
Figure 1B:
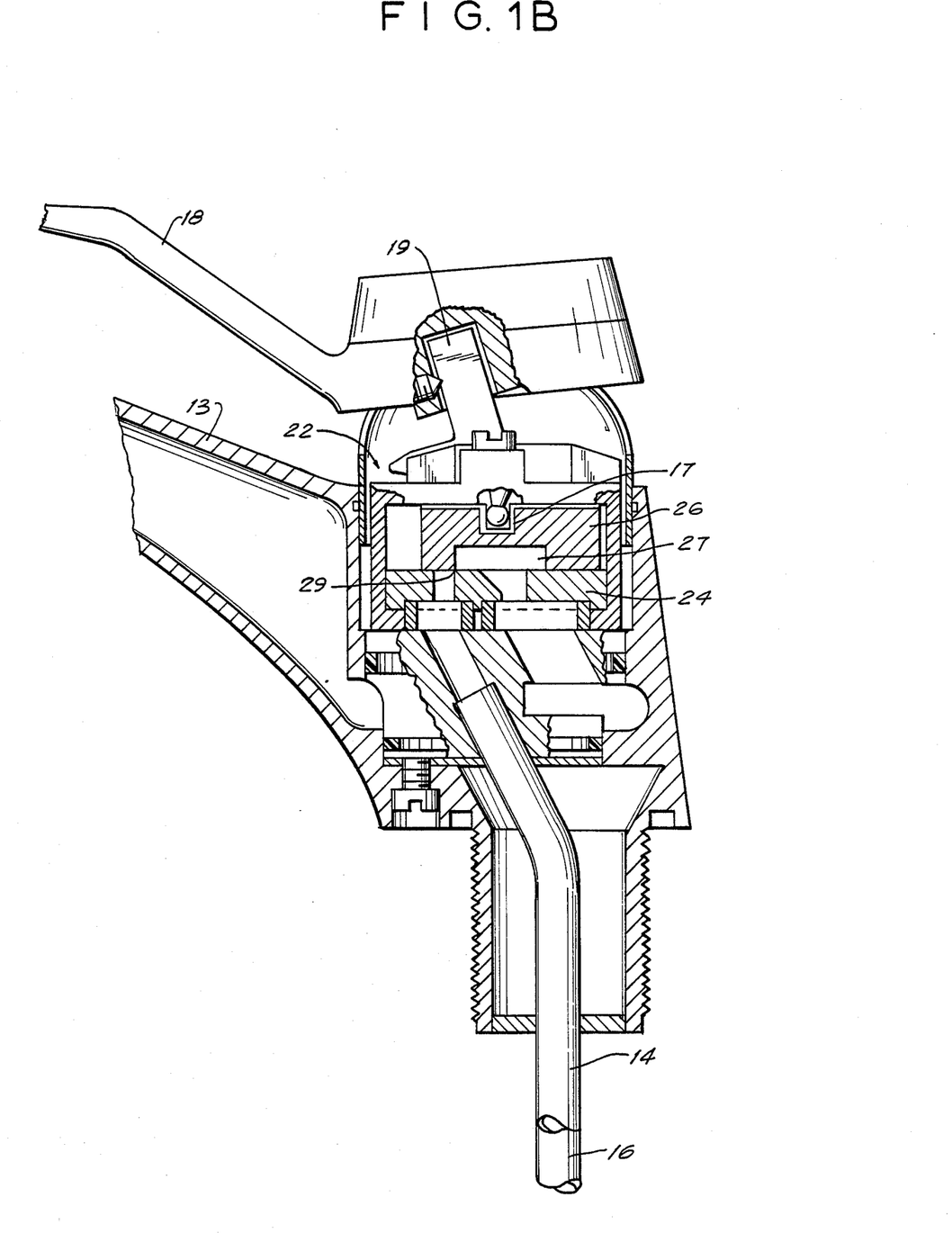
FIG. 1B is a view similar to FIG. 1A, but in its closed position.
Figure 1C:
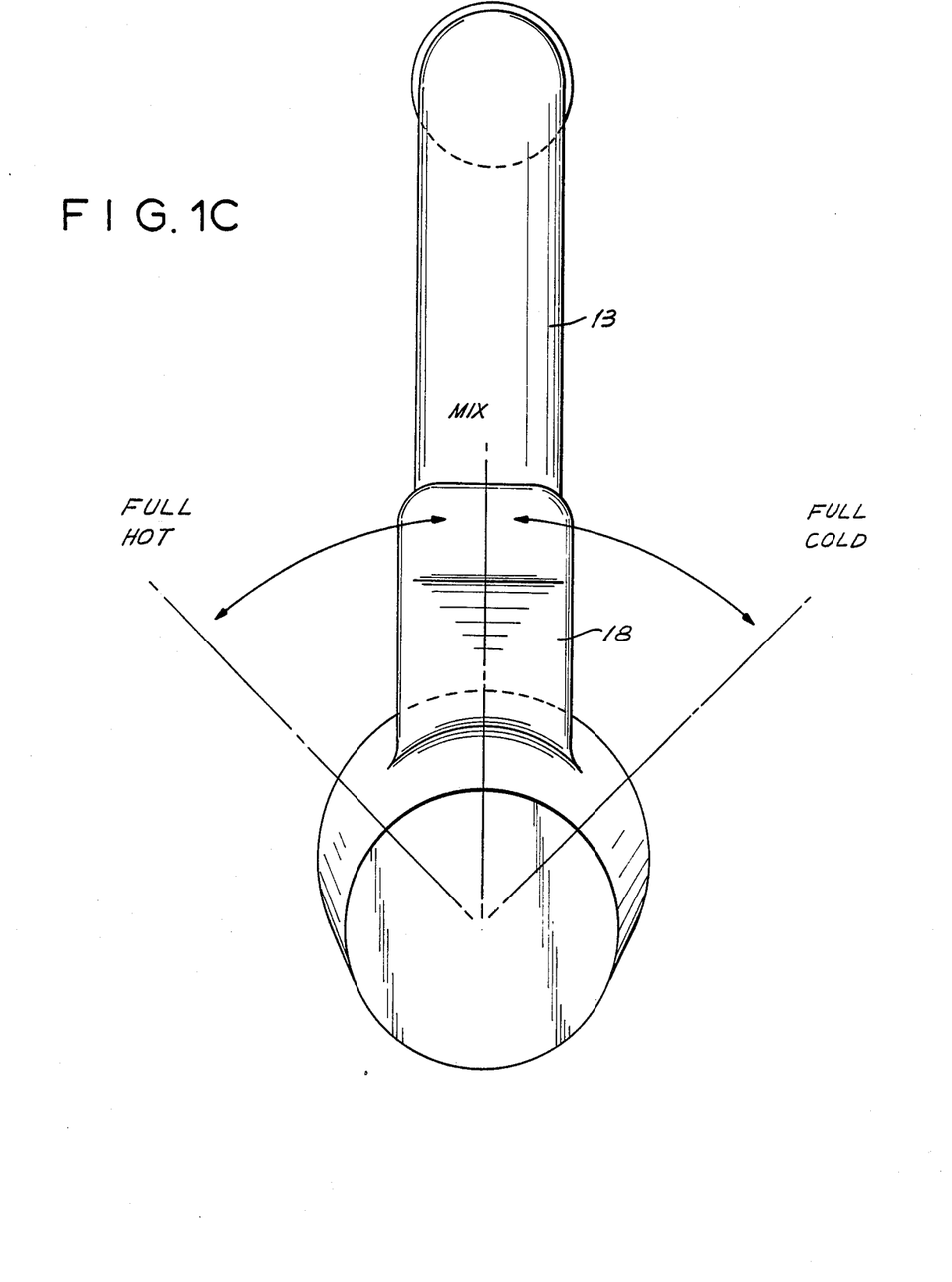
FIG. 1C is a top plan view with the single-handle mixing valve in its full mixing position.

As FIGS. 3A–3B to 13A–13B illustrate, the centroids 28 of inlet openings 21,23 are shifted a few degrees toward the cold water setting by handle 18, shown operably coupled in FIGS. 1A, 1B to movable disc 26. In this way, hydraulic asymmetry is achieved in the central positions of movable disc 26. For such actuation, handle 18 is connected to control lever 19, mounted on cartridge 22, which engages a recess 17 in movable disc 26. Movable disc 26 is arranged to slide and pivot to control both water flow and temperature through handle 18. Mixing chamber 27 opens only towards valve seat disc 24. As movable disc 26 is shifted over valve seat disc 24, mixing chamber 27 will overlap hot and cold inlet openings 21,23 and outlet opening 25 in varying degrees by means of a control edge 29. Inlet opening 21 for hot water water communicates by way of a connecting hot water pipe 14 with flow heater 12. Movable disc 26 is provided with a projection 30 having a thickened end 36 guided between parallel ribs, not shown, on the inside wall of valve cartridge 22

Owing to the hydraulic asymmetry, according to the invention, when movable disc 26 is shifted to its central positions by operating handle 18 and, hence, in the usual mixed water temperature ranges bounding a so-called comfort zone, it is ensured that the free flow section at inlet opening 23 for cold water, shown in the embodiments of FIGS. 3A to 13A and 15A, with the special aid of control edge 29, will be reduced when compared to the hot water side. The free flow section for hot water remains unaffected in the central positions.

Hydraulic asymmetry is accomplished by merely shifting centroid 28 of the port areas of hot and cold inlet openings 21,23 in the fixed valve seat disc a few degrees towards the cold water setting. This means that the inlet openings may be identical to each other, as shown in FIGS. 3A to 13A.

Figure 14A:
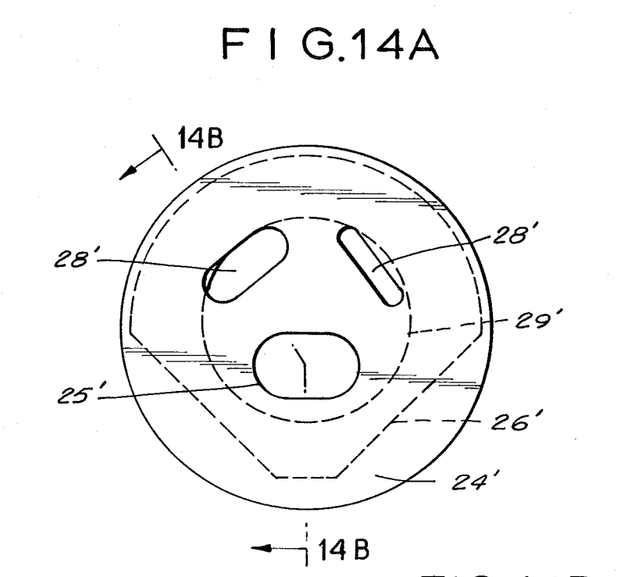
FIGS. 14A-14B are another embodiment of the valve assembly shown in FIGS. 2A-2B.
Figure 14B:
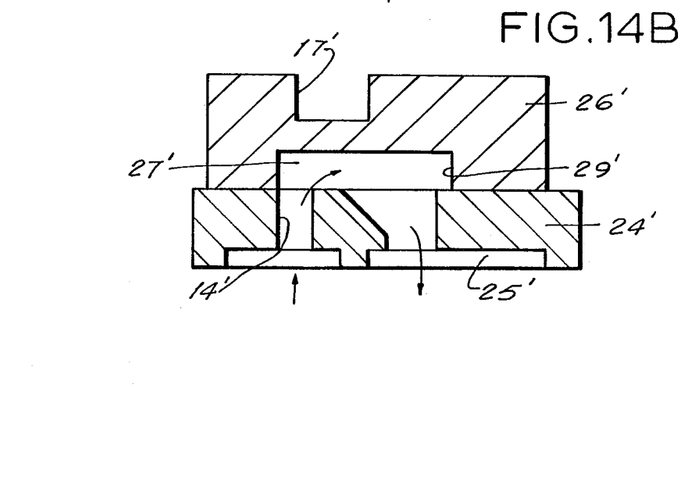
Figure 15A:
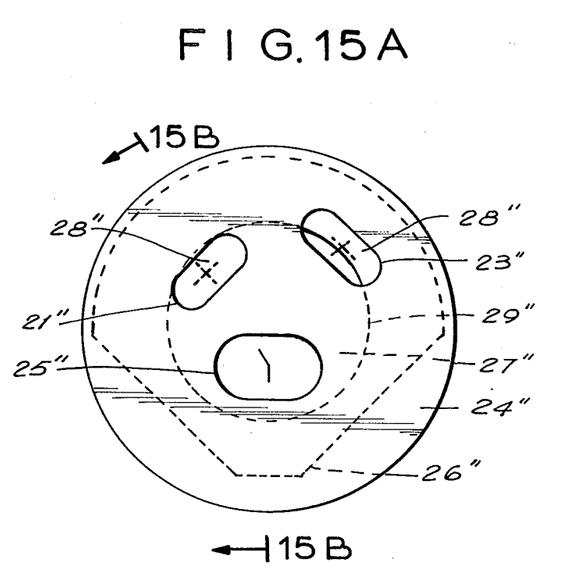
FIGS. 15A-15B are a further embodiment of the invention, as shown in FIG 2A-2B.
Figure 15B:
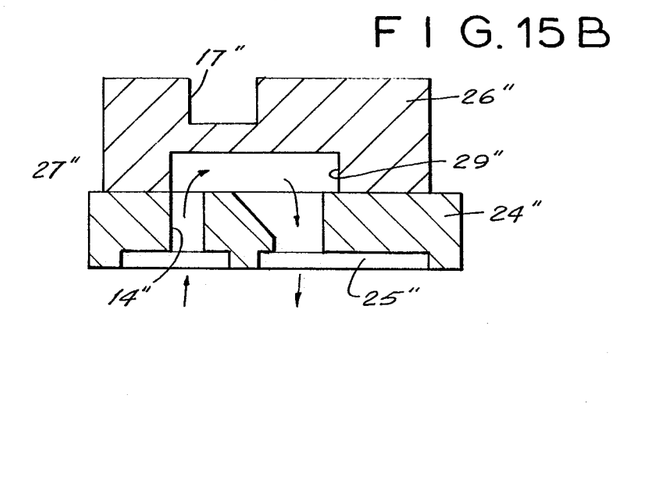

Hydraulic asymmetry is also accomplished by simply making inlet opening 21' for hot water larger in cross section than inlet opening 23' for cold water, FIG. 14A. Thus, hydraulic asymmetry is achieved when handle 18 is in its central position. Centroids 28' of hot and cold inlet openings 21', 23' need not be shifted toward the cold water setting.

Figure 9A:
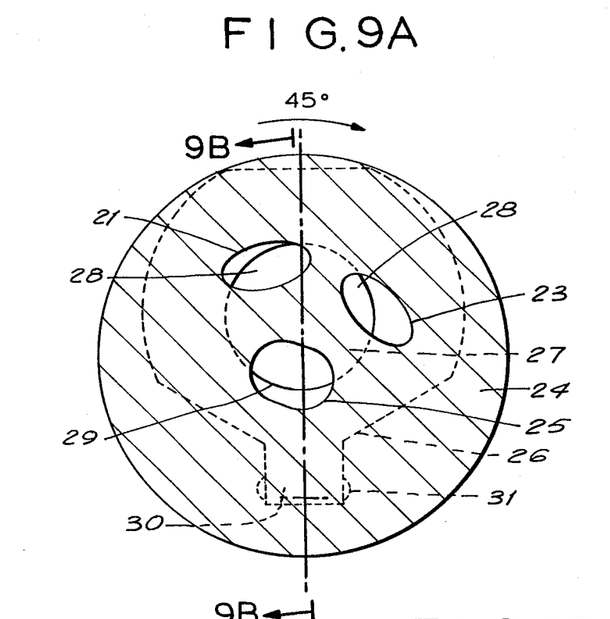
Figure 9B:
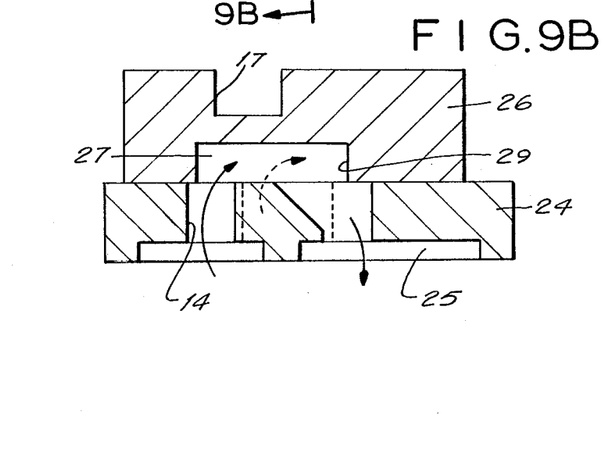
Figure 10A:
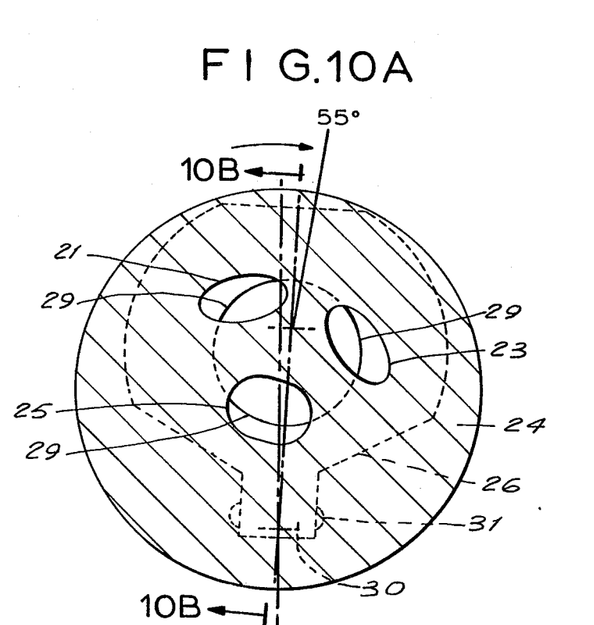
Figure 10B:
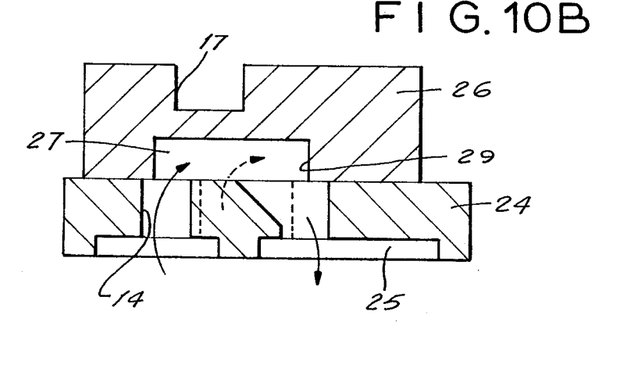
Figure 11A:
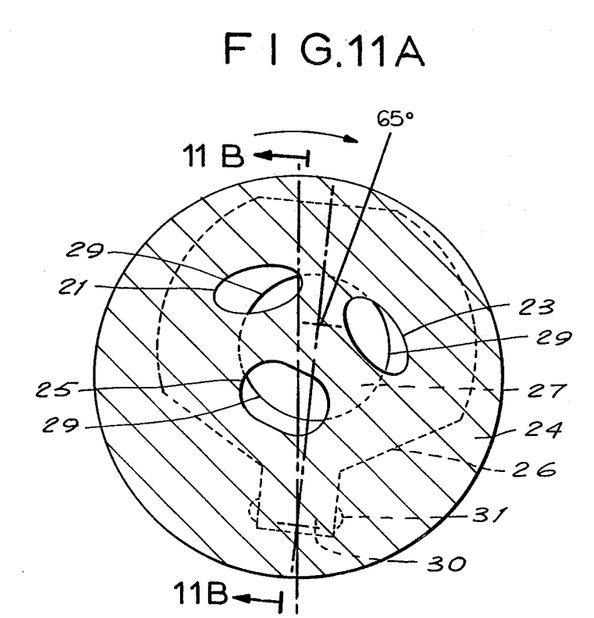
Figure 11B:
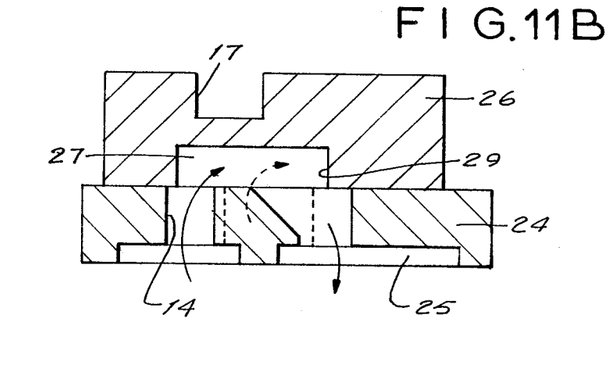
Figure 12A:
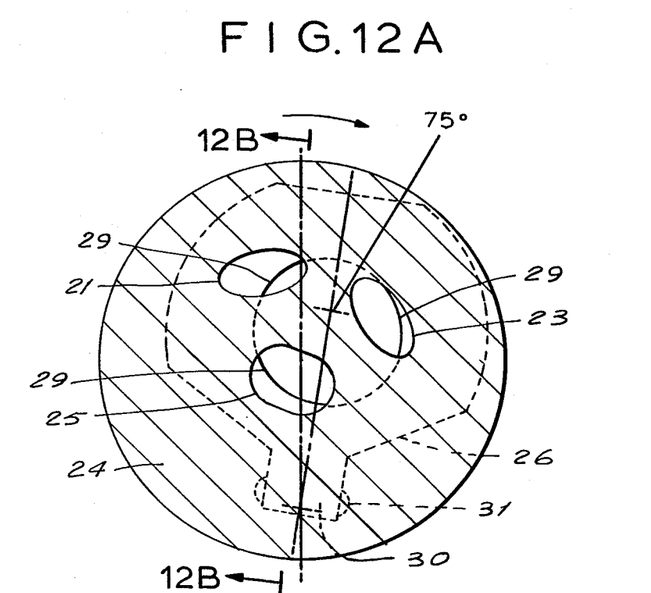
Figure 12B:
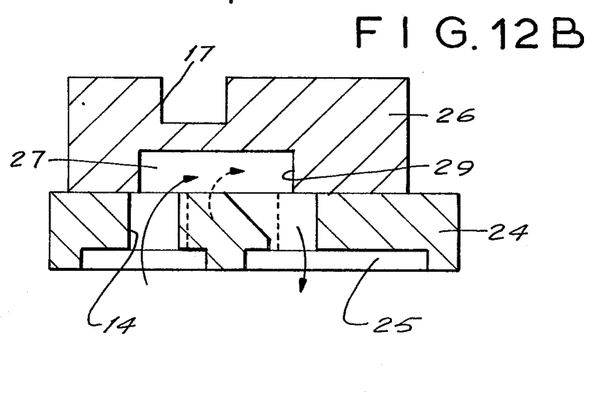
Figure 13A:
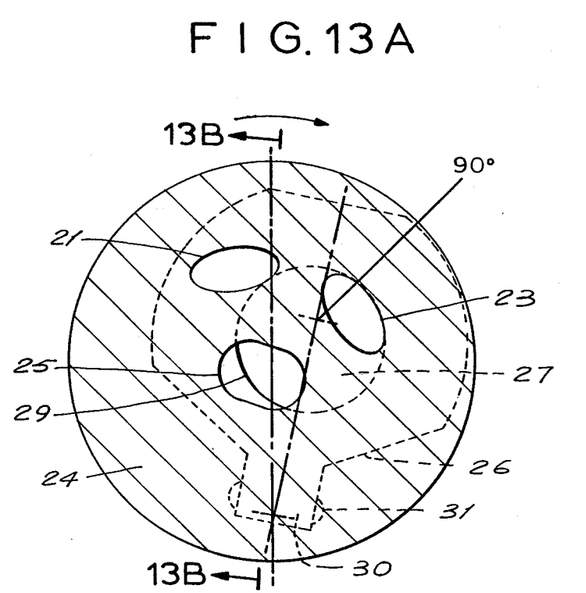
Figure 13B:
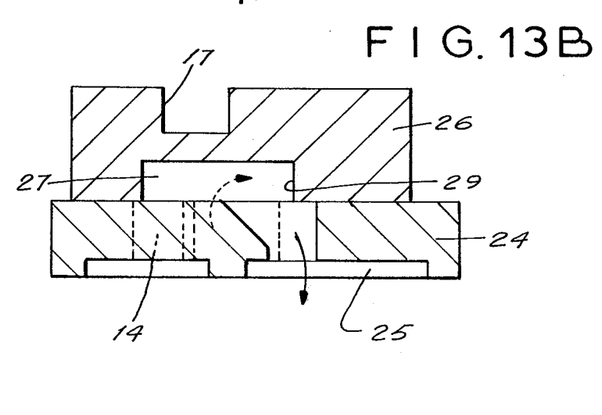

In the example shown dotted in FIG. 9A, both means to achieve hydraulic asymmetry are adopted, that is, centroids 28 are shifted toward the cold water setting, and the port areas of inlet openings 21,23 differ in size, the lengthwise extent of inlet opening 21 for hot water being greater than that of inlet opening 23 forcold water. Note that inlet opening 23 is kidney-shaped and has its internal edge 32 drawn inward.

As previously mentioned, the embodiments represented and described are merely examples of the embodiment of the invention, and the latter is not limited thereto, rather, still other possibilities are available within the scope of the invention, especially regarding the special design and positions of the inlet openings. Thus, the centroid of the port area of inlet opening 23 for cold water might alone be shifted a few degrees of angle toward the cold water setting.

As the term "comfort zone", it generally relates to the range of mixed water temperatures from between about 35° and 45° C. Also, within this comfort zone, a comparatively wide swing of the operating lever should bring about only a comparatively small variation in mixed water temperature.

Lastly, it is to be pointed out that a mixing valve, according to the invention, where the hot water inlet is larger than the cold water inlet, may alternatively be embodied as a two-handle valve, having two shut-off valves for hot and cold water. Such shut-off valves may also have disc-like control elements, the inlet port of the shut-off valve for hot water being larger than that of the cold water shut-off valve.

It is claimed:

1. A single-handle mixing valve in combination with an in-line flow heater, said mixing valve comprising: valving means having at least two disc, one of which is in the form of a fixed valve seat having an outlet opening and asymmetrically formed hot and cold water inlet openings, the other of said discs, arranged in face-to-face sealing contact with said valve seat disc, is shiftably mounted thereon, said movable disc having a chamber formed therein, so that when said movable disc is shifted a few degrees toward the cold water setting, the edge forming the perimeter of said chamber on said movable disc uncovers free flow areas of the asymmetrically formed hot and cold water inlet openings whereby hydraulic symmetry is achieved.

2. The single-handle mixing valve, according to claim 1, wherein said hot water inlet opening has a greater cross sectional area than said cold water inlet opening.

3. The single-handle mixing valve, according to claim 1, wherein the inlet opening for cold water is elliptically-shaped, the interior edge of the opening being drawn inward.

4. The single-handle mixing valve, according to claim 1, wherein the lengthwise extent of the inlet opening for hot water is greater than that of the inlet opening for cold water.

* * * * *